US006072426A

United States Patent [19]

Roos

[11] Patent Number: 6,072,426

[45] Date of Patent: Jun. 6, 2000

[54] MODULATOR SLOPE CALIBRATION CIRCUIT

[75] Inventor: Mark G. Roos, Shawnee, Kans.

[73] Assignee: AlliedSignal Inc., Morristown, N.J.

[21] Appl. No.: 08/910,189

[22] Filed: Aug. 12, 1997

Related U.S. Application Data

[60] Provisional application No. 60/024,072, Aug. 15, 1996.

[51] Int. Cl.[7] .............. G01S 7/40

[52] U.S. Cl. .............. 342/174

[58] Field of Search .............. 342/174, 173, 342/165, 122, 120, 128, 200, 83, 85; 331/4, 178, 177 R

[56] References Cited

U.S. PATENT DOCUMENTS

| | | | |
|---|---|---|---|
| 3,364,437 | 1/1968 | Loposer | 331/1 |
| 3,535,651 | 10/1970 | Peterson | 331/4 |
| 3,579,281 | 5/1971 | Kam | 332/30 V |
| 4,272,729 | 6/1981 | Riley | 331/1 A |
| 4,468,638 | 8/1984 | Kyriakos | 331/178 |
| 4,488,123 | 12/1984 | Kurihara | 331/2 |
| 4,593,287 | 6/1986 | Nitardy | 343/17.5 |
| 4,754,277 | 6/1988 | Voyce | 342/83 |
| 4,851,080 | 7/1989 | Howe | 73/517 |
| 4,904,956 | 2/1990 | Dennis | 331/4 |
| 4,931,749 | 6/1990 | Walters | 331/4 |
| 4,945,360 | 7/1990 | Trummer et al. | 342/122 |
| 4,998,217 | 3/1991 | Holcomb | 364/573 |
| 4,999,636 | 3/1991 | Landt et al. | 342/145 |
| 5,175,509 | 12/1992 | Taylor | 331/4 |
| 5,210,539 | 5/1993 | Voyce | 342/83 |
| 5,252,981 | 10/1993 | Grein | 342/200 |
| 5,369,376 | 11/1994 | Leblebiciogiu | 331/8 |
| 5,440,275 | 8/1995 | Erb | 331/4 |

FOREIGN PATENT DOCUMENTS 42 13 135 A 1 10/1993 Germany .

OTHER PUBLICATIONS

Burrer, et al., "Resonant Silicon Accelerometers in Bulk MicroMachining Technology—An Approach," *J. Micro. Systems.* 5(2):122–130, 1996.

*Primary Examiner*—Daniel T. Pihulic

[57] ABSTRACT

In order to provide for dynamic calibration of a radio altimeter which utilizes frequency modulated continuous waves having a triangular wave form, a selected frequency output of the altimeter is compared, during a calibration interrupt of the output of the altimeter, to a predetermine value for that frequency and if it differs, the frequency is adjusted to the correct value. Each frequency in the triangular wave is individually calibrated during separate calibration mode interrupts. Specifically, each frequency is calibrated by coupling a portion of the altimeter signal to a prescaler circuit and using the prescaler circuit in combination with a modulation frequency counter to input a value representing the frequency to a control microprocessor. The microprocessor then compares this value to a desired frequency and adjusts a value in a memory that is used to control the frequency output of a voltage controlled oscillator that is used to generate the frequency modulated continuous wave.

12 Claims, 2 Drawing Sheets

MODULATOR SLOPE CALIBRATION CIRCUIT

FIELD OF INVENTION

The invention relates aircraft radio altimeters, also known as radar altimeters, and more particularly to calibration of radio altimeters. This application claims priority from U.S. Provisional Application Ser. No. 60/024,072 filed Aug. 15, 1996.

BACKGROUND OF THE INVENTION

Radio altimeters determine altitude by transmitting a radio signal to the ground and timing the delay of the return echo. Most general aviation radio altimeters transmit a frequency modulated continuous wave (FMCW) at 4.2 GHz to 4.4 GHz. The continuous wave is usually frequency modulated such that the frequency increases linearly, then decreases linearly. The linearity and the slope of the modulation are key parameters that affect the accuracy of the radio altimeter. The transmitted frequency modulated radio signal must be extremely linear in frequency as it varies in time. The frequency deviation rate must occur at a precise slope (Hz per foot of altitude rate).

Modulation linearity is very difficult to maintain. The linearity is adjusted during production by means of variable circuit elements. Linearity may also be maintained through using close tolerance circuit components to limit variability. Current radio altimeter calibration technology requires delay lines to help maintain the desired slope during operation. To be effective, the delay line must be manufactured to close tolerances using close tolerance circuit elements. Delay line installation is labor intensive. Current radio altimeter calibration technology does not provide any means for dynamically correcting modulation non-linearity's.

SUMMARY OF THE INVENTION

The invention responds to the need for a simpler method of maintaining modulation linearity by eliminating the need for a delay line or other costly calibration techniques. One embodiment of the invention uses a calibration circuit to selectively compare each frequency generated by the radio altimeter to the desired frequency and if the frequencies are not equal, adjusts the frequency generated by the radio altimeter to maintain a desired modulation slope.

One embodiment of the invention uses a coupler to obtain and a prescaler circuit to divide each frequency modulated signal generated by the radio altimeter. Each divided signal is then counted to determine the frequency of that particular radio altimeter signal and resulting frequency information is used by a microprocessor in the radio altimeter to correct, as necessary, each frequency generated by the radio altimeter in order to maintain the desired modulation slope.

According to one aspect of the invention, a radio altimeter having microprocessor controlled, voltage controlled oscillator for generating a frequency modulated continuous wave altimeter signal having a triangular wave form, where each frequency in the wave form is represented by a value in a drive circuit for the voltage controlled microprocessor, uses a calibration circuit to adjust each frequency to maintain a desired modulation slope. The calibration circuit uses a frequency counter to generate a digital value representing the current frequency of the radio altimeter signal where the wave form has been interrupted to generate just one of the frequencies for a predetermined amount of time. The digital value is compared in the microprocessor to the desired frequency and if it does not match, the microprocessor corrects the value in the voltage controlled oscillator drive circuit for that frequency. In one embodiment of the invention, each calibration interrupt occurs after a predetermined number of cycles of the triangular wave and one frequency is checked for each interrupt until every frequency has been checked. This calibration process is repeated continually while the radio altimeter is in operation.

Thus, the invention provides a modulation linearity control circuit which forms a closed loop feedback system with the radio altimeter such that variations in modulation linearity and slope are dynamically canceled.

DETAILED DESCRIPTION OF THE PREFERRED EMBODIMENTS

Figure 1:
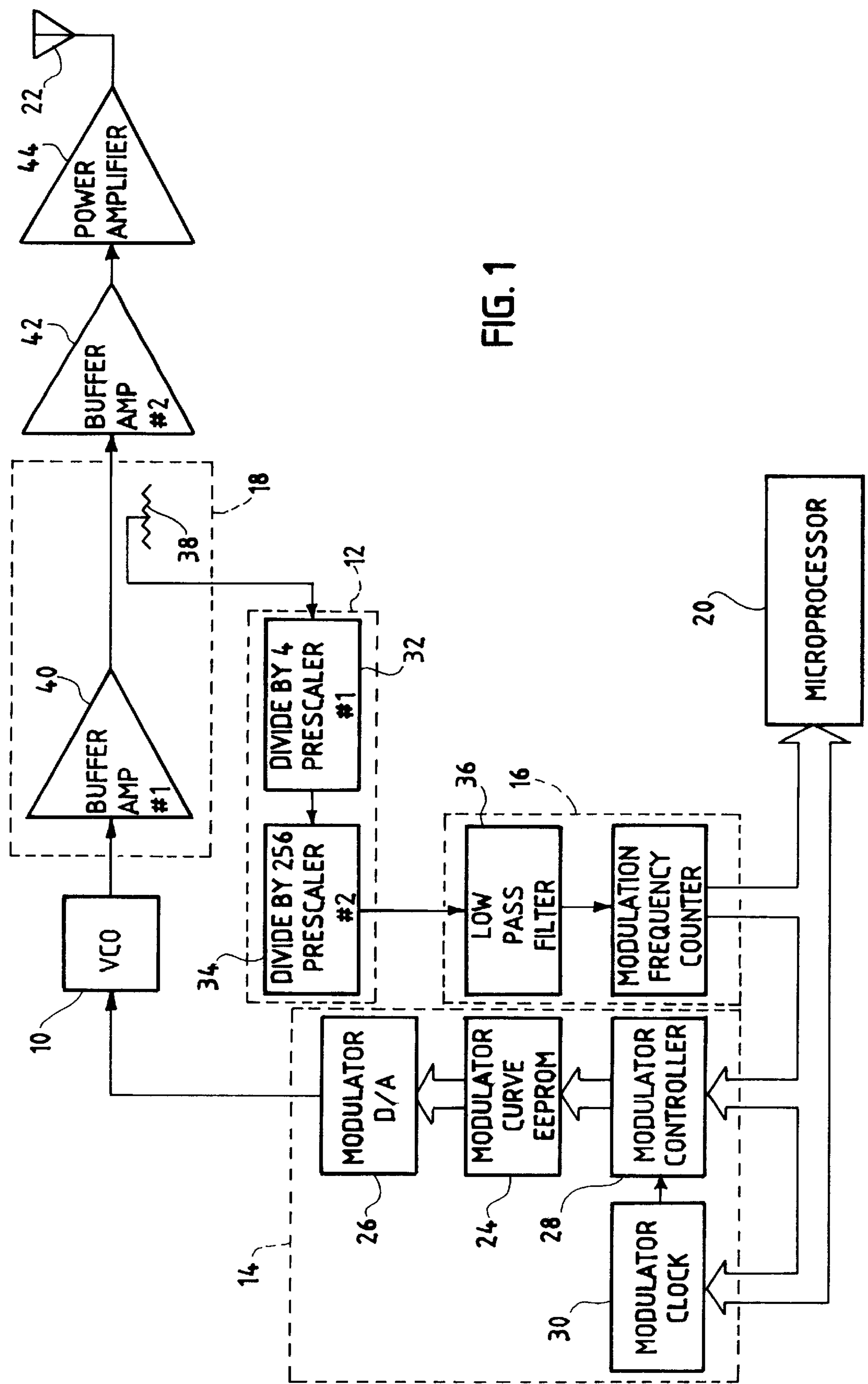
FIG. 1 is a block diagram illustrating a radio altimeter calibration system according to an embodiment of the invention.

FIG. 1 provides in block diagram form an illustration of a preferred embodiment of the invention. The invention includes a voltage controlled oscillator (VCO) 10, a prescaler circuit 12, a VCO driver circuit 14, a modulation frequency counter 16, a calibration coupler 18, and a microprocessor 20. Here, the VCO driver circuit 14 generates voltages which cause VCO 10 to frequency modulate. The calibration coupler 18 applies the modulated radio altimeter signal to prescaler circuit 12, which divides the radio altimeter signal by 1024. The divided signal is likewise frequency modulated. The modulation frequency counter 16 determines the frequency of prescaler circuit 12 output. The prescaler frequency is read by microprocessor 20, which modifies VCO driver circuit 14 to maintain the desired linear frequency modulation.

A transmitter for the altimeter signal is provided by the VCO 10 and the VCO drive circuit 14. The VCO drive circuit 14 provides a specific voltage over time which controls frequency linearity and deviation rate. In order that the radio altimeter provide an accurate measure of altitude above ground, the frequency modulated altimeter signal, which is transmitted from the radio altimeter from an antenna 22, should be extremely linear in frequency as it varies in time such that the frequency deviation rate occurs at a precise Hz per foot rate slope.

As is conventional in this type of radio altimeter, the microprocessor 20 controls the application of the voltage to the VCO 10 by using a non-volatile RAM (NOV RAM) 24 and a digital-to-analog (D/A) converter 26. The NOV RAM 24 consists of 475 memory locations each containing a value representing a frequency in the frequency modulated altimeter signal. At the beginning of a modulation cycle, microprocessor 20 issues a command to a NOV RAM controller circuit 28 to start modulating. This controller 28 sends addresses to the NOV RAM 24. The D/A converter 26 then receives data from the NOV RAM 24 and in turn the VCO 10 receives voltage from the D/A 26.

Upon completion of the 16th modulation ramp cycle, microprocessor 20 issues a command to the NOV RAM controller 28 to do a calibration cycle. A calibration cycle calculates only one memory location in the memory 24 per cycle. At the completion of the 475th memory location, the NOV RAM 24 is issued a save command. As a result, all 475 memory locations in the NOV RAM 24 receive continuous calibration.

During calibration, a small portion of the energy from the VCO 10 is used as a feedback signal to microprocessor 20. This feedback signal to microprocessor 20 uses the following circuits: the calibration coupler 18; the prescaler circuit 12; and the modulation frequency counter 16.

The output of the VCO 10 is at a fixed modulation rate, thus the VCO's output frequency is known. The measured or test frequency from modulation frequency counter 16 is then compared in the microprocessor 20 to the desired frequency. If the two frequencies match, the VCO's 10 modulator voltage is correct for that specific point in time. If the two frequencies do not match, the VCO's 20 modulation voltage is corrected and the correction data value is saved in the NOV RAM 24.

The VCO driver circuit 14 may be made from discrete RF components or exist as a stand alone module. In a preferred embodiment, VCO driver circuit 14 is mounted on a printed circuit board with a controlled dielectric and includes: a modulator clock 30, the modulator controller 28, the modulator curve EEPROM 24, and the modulator digital-to-analog converter 26.

Prescaler circuit 12 includes a divide by four prescaler circuit 32 followed by a divide by 256 prescaler circuit 34. The result is a signal which has 1024 times lower frequency than the 4.2 GHz to 4.4 GHz RF signal. Prescaler circuit 12 is preferably mounted on a printed circuit board with a controlled dielectric.

The modulation frequency counter 16 is a digital circuit which determines the frequency of the divided signal and includes a low pass filter 36.

The calibration coupler 18 is a microstrip coupler made from traces, indicated by a line 38, on a printed circuit board with a controlled dielectric and includes a buffer amplifier 40. The microprocessor 20 can be any suitable standard digital microprocessor.

Figure 2:
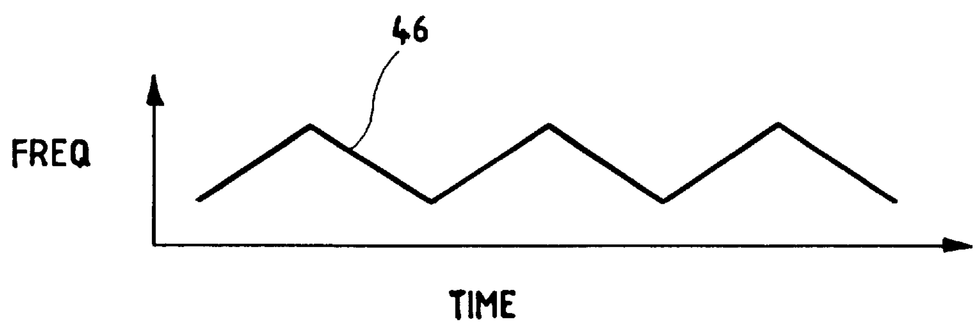
FIG. 2 is a graphical representation of a frequency modulated continuous wave (FMCW) transmitted by the system of FIG. 1.

FIG. 2 illustrates the normal signal output on the antenna 22 of the radio altimeter. The frequency modulated continuous wave signal generated by the VCO 10 is transmitted through a buffer amplifier 40 and amplified by a power amplifier 44. As a result, the signal output of the antenna 22 will have the triangle frequency versus time form shown by a line 46 in FIG. 2.

Figure 3:
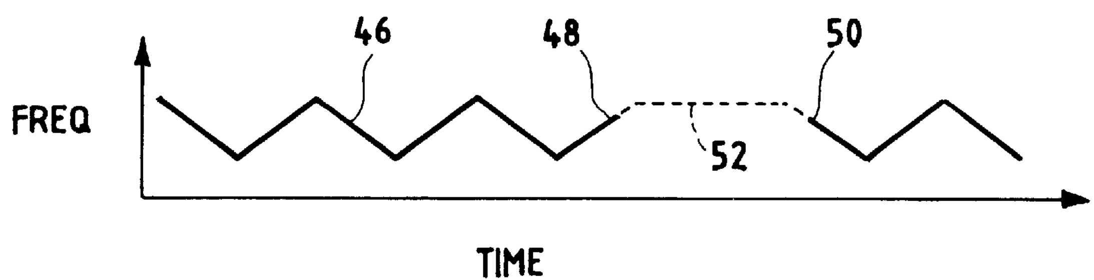
FIG. 3 is a graphical representation illustrative of the interruption of the triangle wave sequence of FIG. 2 according to a calibration mode according to the invention.

In the preferred embodiment of the calibration mode, as graphically illustrated in FIG. 3, the VCO driver circuit 14 is periodically commanded by the microprocessor 20 to interrupt the triangle wave 46 output of the VCO 20 at a point 48 and generate an output having a constant frequency for a predetermined amount of time ending at a point 50. This period of constant frequency is shown by a dotted line 52 in FIG. 3. During this period 52, the modulation frequency counter 16 reads the frequency output of prescaler circuit 12. The microprocessor 20 then uses the frequency from modulation frequency counter 16 to adjust the VCO driver circuit 16, as described above, to produce the desired frequency for that point in the triangular wave 46. The VCO driver circuit 14 then, in response to the microprocessor 20, resumes generating the triangle waves 46 at the point 50. This sequence is then repeated with a different frequency selected during each calibration mode time until each frequency in the triangle wave 46 has been calibrated. Thus, by utilizing the calibration system it is possible to continuously and dynamically calibrate a radio altimeter to maintain modulation linearity while an aircraft is in flight.

It should be understood that the invention has been described in terms of its preferred embodiment and that certain modifications and equivalents thereof will be obvious and fall within the scope of the invention as claimed herein.

I claim:

1. A radio altimeter calibration system comprising:

a radio altimeter including a transmitter for generating and transmitting a frequency modulated continuous wave altimeter signal including control means for increasing and decreasing the frequency of said altimeter signal linearly over time to produce a triangle shaped wave form; and calibration means operatively connected to said transmitter and said control means for selectively comparing each frequency of said altimeter signal to a predetermined frequency and causing said control means to adjust the altimeter signal in accordance with the comparison.

2. The system of claim 1 wherein said calibration means includes a frequency counter for generating a frequency value representing the frequency of said altimeter signal for comparison with said predetermined frequency.

3. The system of claim 2 wherein said calibration means includes a prescaler circuit connected between said transmitter and said frequency counter for dividing said altimeter signal by a predetermined divisor.

4. The system of claim 3 wherein said divisor is equal to 1024.

5. The system of claim 1 wherein said calibration means includes a microstrip coupler for detecting said altimeter signal.

6. The system of claim 1 wherein said control means periodically interrupts the generation of said triangle wave form and causes said transmitter to generate said altitude signal at a predetermined test frequency corresponding to said predetermined frequency for a predetermined amount of time.

7. The system of claim 6 wherein each of said interrupts occurs after a predetermined number of said triangle wave forms have been generated and wherein after each interrupt another of said test frequencies is selected for comparison with a corresponding another of said predetermine test frequencies.

8. A radio altimeter calibration system comprising:

a radio altimeter including a transmitter, including a voltage controlled oscillator operatively connected to a voltage controlled oscillator drive circuit, for generating and transmitting a frequency modulated continuous wave altimeter signal and control means, wherein said drive circuit includes a memory containing frequency values representing a desired frequency for each frequency in said altimeter signal and control means operatively connected to said drive circuit for controlling said drive circuit to linearly increase and decrease the frequency of said altimeter signal in response to said frequency values to produce a triangle shaped wave form;

a frequency counter connected to said transmitter for generating a test frequency value representing the frequency altimeter signal generated by said transmitter;

interrupt means for causing said control means to interrupt the generation of said triangle wave form and to generate said altitude signal at a predetermined test frequency for a predetermined amount of time;

comparison means for causing said control means to compare said test frequency value to the desired frequency corresponding to said test frequency generated by said transmitter; and correction means for replacing the frequency value in said memory to correspond to the frequency value that will cause said voltage controlled oscillator to generate said desired frequency if said test frequency does not match the desired frequency.

9. The system of claim 8 wherein said interrupt means generates said interrupt after a predetermined number of cycles of said triangle wave forms have been generated and wherein after each interrupt another frequency generated by said transmitter is selected as said test frequency for comparison with the corresponding desired frequency.

10. A method for calibrating a radio altimeter comprising the steps of:

generating a frequency modulated continuous wave altimeter signal from a transmitter section of the radio altimeter;

interrupting said altimeter signal;

generating a single frequency test signal from said transmitter section;

counting the frequency of said test signal;

comparing said count of said test signal to a desired frequency corresponding to said test frequency, wherein said desired frequency represents each frequency in said altimeter signal; and adjusting said transmitter section to generate a frequency equal to said desired frequency if said test frequency is not equal to said desired frequency.

11. The method of claim 10 wherein said transmitter section includes a voltage controlled oscillator connected to a drive circuit having a memory containing values representing the frequencies in said altimeter signal and wherein said step of adjusting said transmitter section includes the step of replacing the value for said test frequency in said memory with a corrected value effective to generate said desired frequency.

12. The method of claim 10 additionally including the step of initiating said interrupt step for a different frequency of said altimeter signal after said adjusting step in order to calibrate each frequency in said altimeter signal.

* * * * *